United States Patent
Rosemann et al.

(10) Patent No.: US 7,699,280 B2
(45) Date of Patent: Apr. 20, 2010

(54) FASTENING SYSTEM AND METHOD USING CLIPS TO FASTEN SECOND COMPONENT TO FIRST COMPONENT

(75) Inventors: Frank Rosemann, Muenzenberg (DE); Christian Kempf, Wuerzburg (DE)

(73) Assignee: Newfrey LLC, Newark, DE (US)

( * ) Notice: Subject to any disclaimer, the term of this patent is extended or adjusted under 35 U.S.C. 154(b) by 214 days.

(21) Appl. No.: 11/748,174

(22) Filed: May 14, 2007

(65) Prior Publication Data

US 2007/0262218 A1 Nov. 15, 2007

(30) Foreign Application Priority Data

May 15, 2006 (DE) .................. 10 2006 022 890

(51) Int. Cl.
*A47B 96/06* (2006.01)
*E04G 5/06* (2006.01)
(52) U.S. Cl. .............................. 248/229.1; 248/223.41
(58) Field of Classification Search .............. 248/229.1, 248/229.15, 229.16, 223.41, 222.41, 221.11, 248/220.22
See application file for complete search history.

(56) References Cited

U.S. PATENT DOCUMENTS

| 292,421 | A | * | 1/1884 | DuBois ..................... 238/27 |
| 3,885,362 | A | * | 5/1975 | Pollock .................... 52/126.7 |
| 6,364,262 | B1 | * | 4/2002 | Gibson et al. ........... 248/229.14 |
| 6,796,474 | B2 | * | 9/2004 | Oetlinger ..................... 225/97 |
| 7,137,606 | B2 | * | 11/2006 | Conway et al. ........... 248/291.1 |
| 2007/0194181 | A1 | | 8/2007 | Rosemann et al. |

* cited by examiner

*Primary Examiner*—Amy J Sterling
(74) *Attorney, Agent, or Firm*—Stephen R. Valancius; Michael P. Leary

(57) ABSTRACT

A fastening system uses a plurality of clips for fastening a second component, e.g., a loud-speaker, to a first component, e.g., a vehicle door panel. The clips are mounted on the second component at pre-installation positions and are moved collectively from the pre-installation positions to installation positions at which the clips are retained by retaining elements projecting from the first component.

13 Claims, 3 Drawing Sheets

FASTENING SYSTEM AND METHOD USING CLIPS TO FASTEN SECOND COMPONENT TO FIRST COMPONENT

CROSS-REFERENCE TO RELATED APPLICATION

This application claims the benefit of German Patent Application 10 2006 022 890.1 filed May 15, 2006, incorporated herein by reference.

BACKGROUND OF THE INVENTION

This invention concerns a fastening system and method in which clips are used to fasten a second component to a first component. The invention is further concerned with an arrangement in which clips are moved collectively from pre-installation positions to installation positions at which the clips fasten a second component to a first component.

Fastening systems using clips to fasten a second component to a first component are generally known. They are often used in place of screw connections in order to permit faster installation of a second component on a first component. However, prior fastening systems of this type have limitations, such as difficulty in accomplishing fastening operations in inaccessible locations and the need for dealing with multiple clips that are fed and installed individually in sequence.

BRIEF DESCRIPTION OF THE INVENTION

The present invention provides improved fastening systems using clips to fasten a second component to a first component, provides easy and fast installation of a second component on a first component even in inaccessible locations, and avoids the need for feeding and installing clips individually in sequence. The invention provides clips that are economical to manufacture and easy to use and provides an installation method in which clips mounted on a second component at pre-installation positions are moved collectively to installation positions at which the clips are effective to fasten the second component to a first component.

Briefly stated, in one non-limiting embodiment, clips having a unique construction are mounted on a second component and are held initially at pre-installation positions. Retaining elements projecting from a first component at locations corresponding to the clips become effective to retain the clips when the clips are moved collectively from their pre-installation positions on the second component to their installation positions. The invention can be used, for example, to mount a loudspeaker on a door panel of a vehicle.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
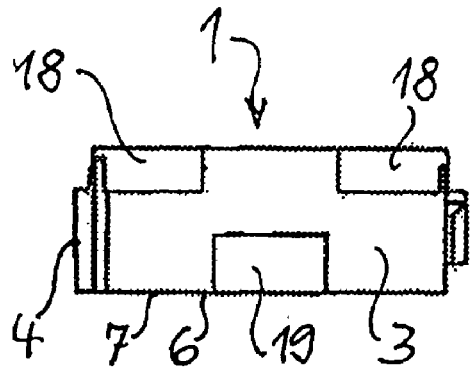
FIG. 1 is a side view of a clip according to the invention.

FIGS. 1-5 show a clip according to the invention, which can be manufactured from a thermoplastic or thermosetting plastic by an injection molding process using a two-part mold, for example. The clip 1 has the shape of a generally rectangular frame comprising a first longitudinal sidewall 2 and a second longitudinal sidewall 3 spaced a uniformed distance from one another, a transverse end wall 4 connecting walls 2, 3 at one end of the frame, and a rib 5 connecting walls 2, 3 at the other end. Walls 2, 3, and 4 are oriented perpendicular to an underside or bottom 7 of the clip having a flat contact surface 6. As used herein, terms such as top and bottom are used merely for ease of description and are not intended to limit the actual orientation of the clip.

As described later in conjunction with FIGS. 6-9, clips 1 of the invention can be used for installing a second component on a first component will be described later in conjunction with FIGS. 6-9. The clips can be mounted on the second component at pre-installation positions. Then the second component, with the clips mounted thereon, can be associated with the first component, so that each clip is associated with a retaining element projecting from the first component. Then the clips can be moved collectively from their pre-installation positions on the second component to installation positions on the second component at which the retaining elements become effective to retain the clips and install the second component on the first component.

Figure 3:
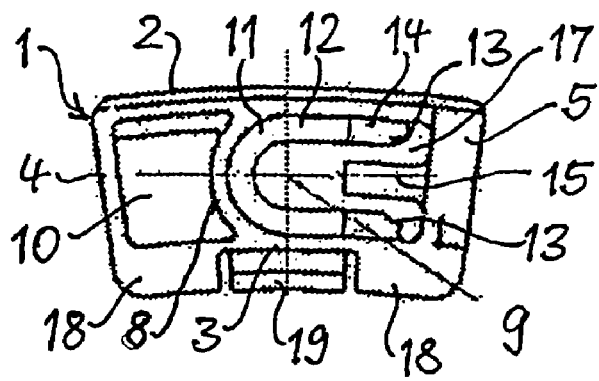
FIG. 3 is a top view of the clip from FIG. 1.
Figure 4:
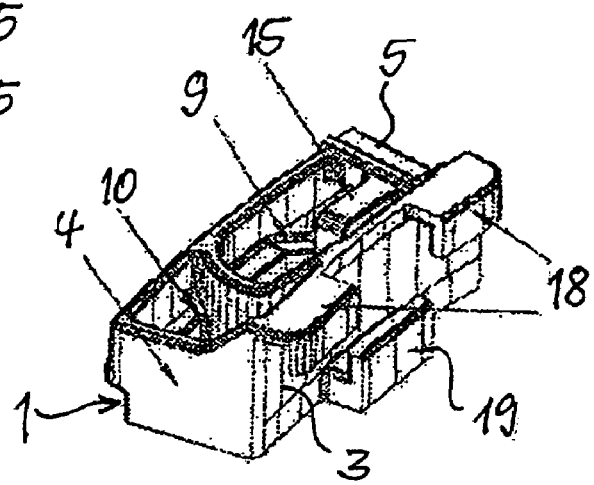
FIG. 4 is a perspective view of the clip from FIG. 1.
Figure 5:
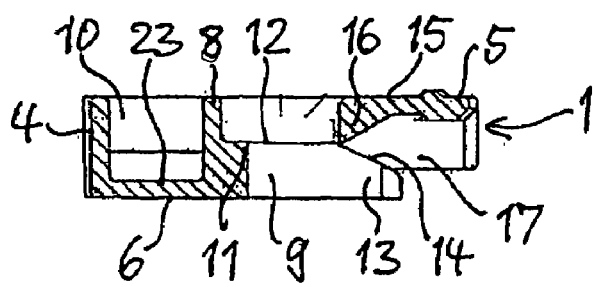
FIG. 5 is a longitudinal section of the clip from FIG. 1.

In the illustrative embodiment, the clips are moved along arcuate paths, and accordingly the sidewalls 2 and 3 of the clip frame are slightly arcuate, as shown in FIGS. 3 and 4. In addition, the transverse wall 4 and the rib 5 define an angle therebetween whose vertex lies on the common axis of curvature of the walls 2, 3, which is perpendicular to the plane of the contact surface 6. As will be seen later, the axis of curvature coincides with the axis about which the clips move from the pre-installation positions to the installation positions. In other embodiments, the sidewalls 2, 3 of the clip may be straight or have different curvatures, and the transverse end wall 4 and the rib 5 may be arranged at different angles to one another.

In the present embodiment, the clip frame is subdivided into a retaining region 9, open at the top and bottom, and a tool engagement region 10, open at the top, by a partition 8 that is connected to the sidewalls 2, 3. The retaining region 9 has a U-shaped shoulder 11 with a shoulder surface 12 located between the top and bottom of the clip frame and oriented substantially parallel to the contact surface 6. The legs of the U-shaped shoulder 11 merge with ramps 13 which extend from the vicinity of a lead-in opening 17 located beneath the rib 5. The ramps 13 have ramp surfaces 14 that rise from the vicinity of the contact surface 6 to the level of the U-shaped shoulder 11.

A resilient latching finger 15 extends from the rib 5 into the retaining region 9 and has a tapered latch 16 at its free end. As later described, finger 15 can be lifted from an initial position to permit insertion of a T-stud retaining element through the lead-in opening 17 and movement along the ramps 13 to reach the shoulder 11, whereupon the finger 15 can spring back to its initial position, at which it blocks movement of the T-stud in a direction opposite to the insertion direction.

Projecting outwardly from the sidewall 3 are a plurality of hooks 18, 19 that serve as mounting elements and guide elements, in a manner to be described. In the form shown, two hooks 18 face downward and a single hook 19 faces upward between hooks 18. In the embodiment, hooks 18 are spaced apart from one another by a gap whose length is equal to or greater than the length of hook 19, which is located below the gap. This arrangement facilitates manufacture in a simple mold.

Sidewall 2 has a step 20 extending along its bottom edge, forming a downward facing guide surface 21 that is parallel to the contact surface 6, and forming a guide surface 22 perpendicular to the contact surface 6.

In the embodiment, the tool engagement region 10 is closed by a bottom wall 23, which prevents a tool used in the tool engagement region 10 from coming into contact with a component on which the contact surface 6 is resting.

The clip 1 is particularly useful in a fastening system for installing a second component on a first component. FIGS. 6-9 show the manner in which a plurality of clips 1 can be used to install a second component 31 on a first component 30. In the example shown in the figures, the first component 30 can be a door panel of a vehicle, and the second component 31 can be a dish-shaped loudspeaker housing. A sealing element 32 is disposed between the components 30, 31.

Figure 6:
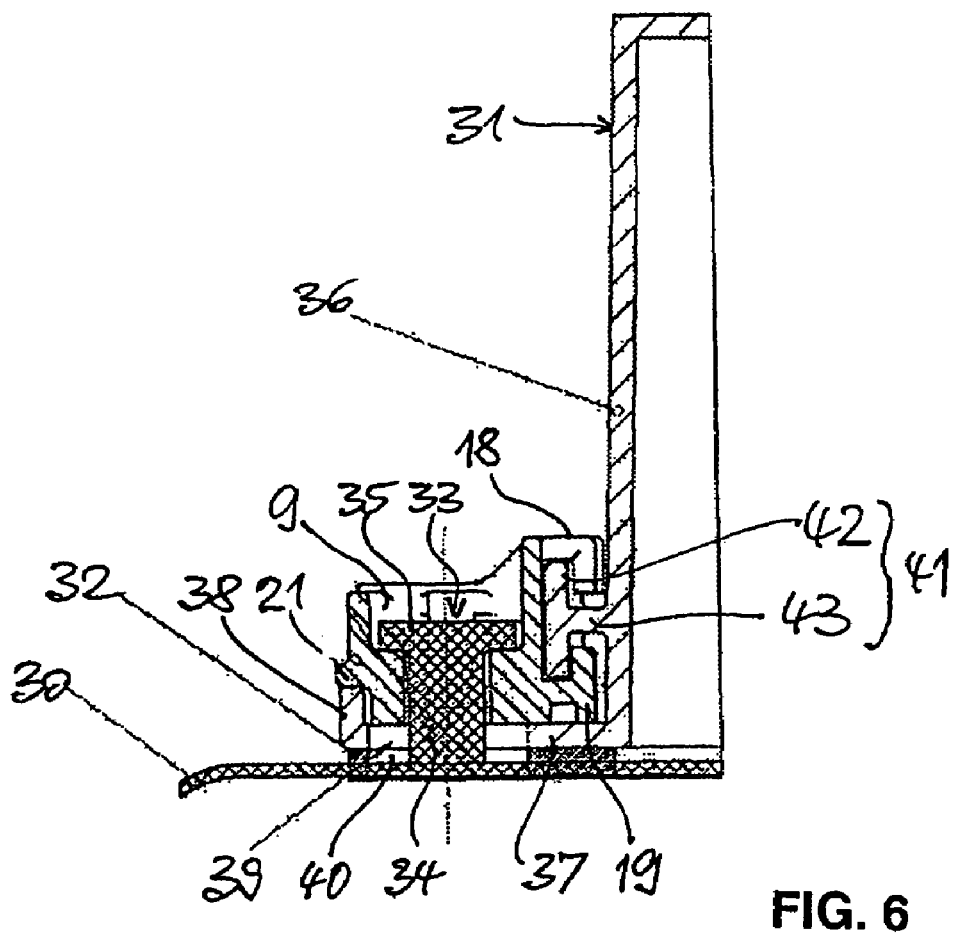
FIG. 6 is a cross-section through a fastening system according to the invention.
Figure 7:
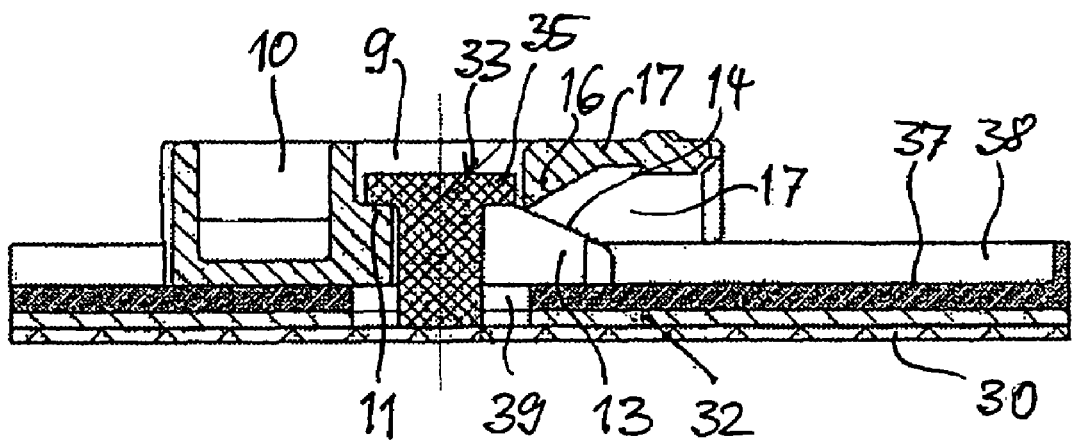
FIG. 7 is a longitudinal section of the fastening system from FIG. 6.

As shown in FIGS. 6 and 7, a retaining element in the form of a T-stud 33 is welded to and projects from the first component 30, which, in the example, is made of sheet metal. The T-stud 33 has a cylindrical shank 34 and a disk-shaped head 35 with a diameter greater than the shank 34. The T-stud 33 and the shoulder 11 constitute cooperable retaining elements for retaining an associated clip 1 on the first component 30.

Figure 2:
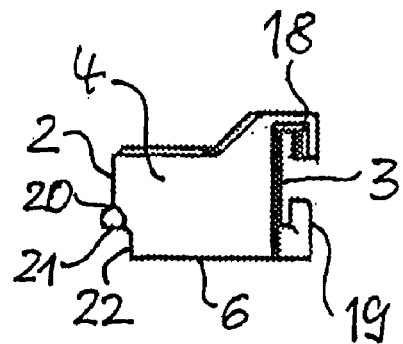
FIG. 2 is an end view of the clip from FIG. 1.

The second component 31 has a generally cylindrical wall 36 from which extends an annular flange 37 outwardly. On its outermost edge, the flange 37 has a guide lip 38 spaced from the wall 36 of the second component 31 and inserted in the step 20 (FIG. 2). The sealing element 32 has an aperture 40 aligned with an aperture 39 in the flange 37.

Projecting outwardly from the wall 36 of the second component 31 is a guide rail 41 that has T-shaped cross-section, as shown in FIG. 6, and that includes a head section 42 on a stem section 43 joining the head section to the wall 36. The head section 42 extends along the wall 36 substantially parallel thereto. Hooks 18 and 19 embrace the head section as shown in FIG. 6.

Figure 8:
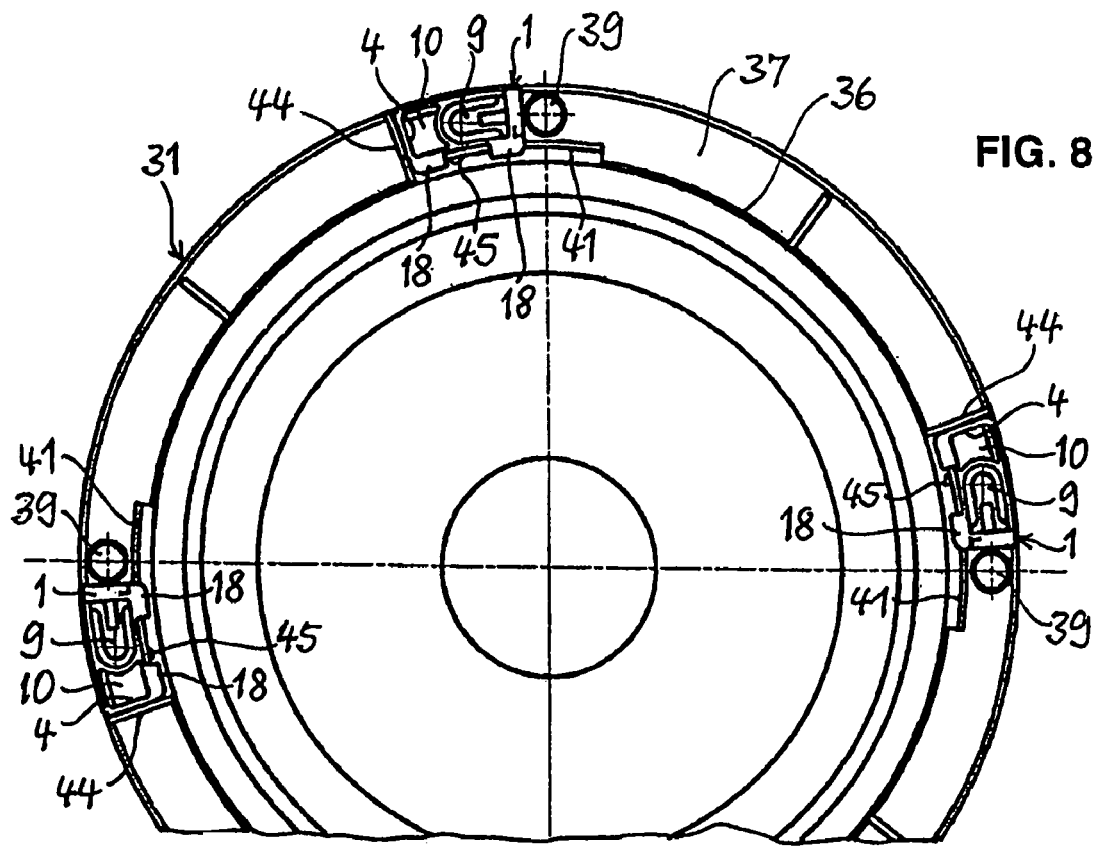
FIG. 8 is a view of a fastening system according to the invention in its pre-installation condition.
Figure 9:
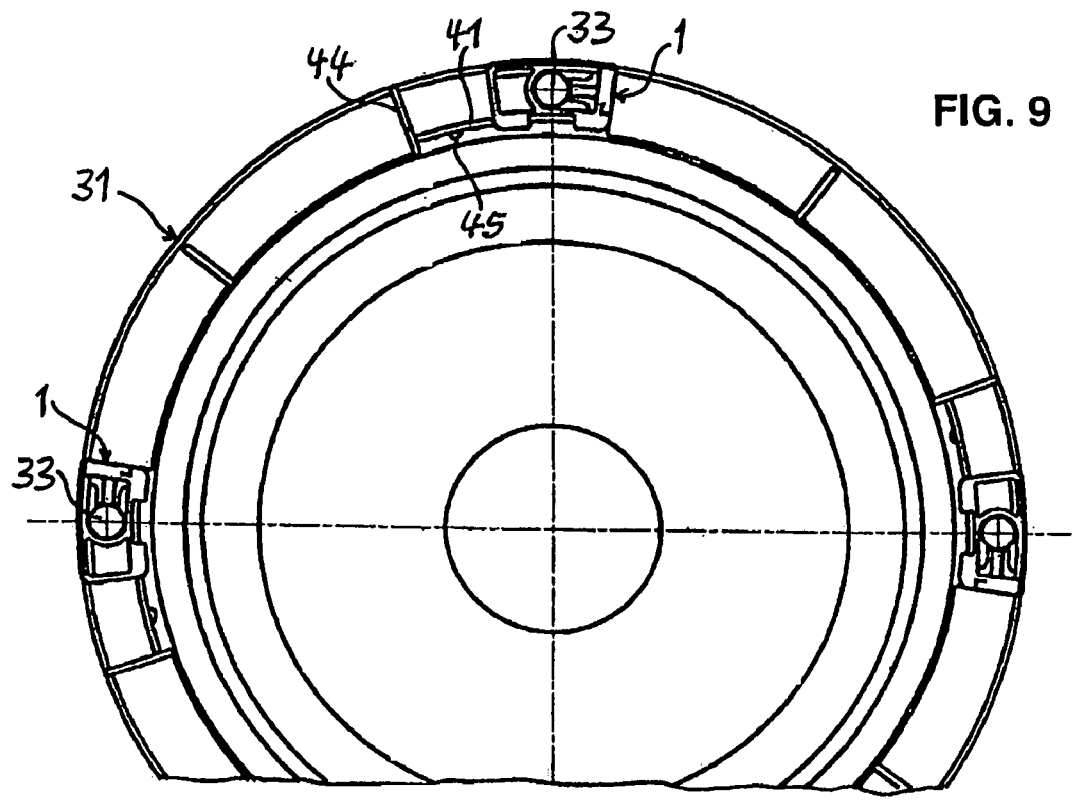
FIG. 9 is a view of the fastening system from FIG. 8 in the installed condition.

As shown in FIG. 8, there is a guide rail 41 located adjacent to each corresponding aperture 39. It is apparent in FIG. 6 that movement of a clip 1 in a direction substantially perpendicular to the plane of the figure can be guided by the guide rail 41 in conjunction with the guide lip 38, which form a type of parallel guide system that guides a clip precisely and without jamming in its motion from a pre-installation position to an installation position.

Each clip 1 is initially pushed onto a free end of its corresponding guide rail 41 and along the guide rail to a pre-installation position shown in FIG. 8, at which the transverse end wall 4 of the clip is against a stop 44, which is a radial wall on the flange 37 that also serves to reinforce the flange. The clip can be braced against the stop during motion opposite to the direction of pre-installation. A detent projection 45 on a top edge of each guide rail 41 cooperates with a recess or hook 18 to secure the clip in the pre-installation position. However, little force is required to override the projection 45 and to move the clip back toward the free end of the associated rail 41. Alternatively, the clip may be provided with a catch that works together with a projection on the second component. Initially, all of the clips can be mounted on a second component 31 that is not yet associated with a first component 30.

To associate the second component 31 with the first component 30, the second component is moved to a position in alignment with the first component at which each aperture 39 is aligned with a T-stud 33. The components can then be juxtaposed so that each T-stud is projected through an aperture 39 and is adjacent to an inlet opening 17 in a corresponding clip 1. When the second component 31 is thus associated with the first component 30, the component 31 rests on the sealing element 32, as can be seen in FIGS. 6 and 7, and the T-studs 33 protrude through the apertures 39. Heads 35 of the T-studs are located directly in front of the lead-in openings 17 of the clips 1.

To install the component 31 on the component 30, an assembly tool can be used, which has a number of fingers corresponding to the number of clips. Each of these fingers engages in a tool engagement region 10 of a respective clip 1. Rotating the assembly tool clockwise in FIG. 8 causes the clips 1 to move along their guide rails 41 and causes the T-studs 33 to enter the lead-in openings 17 of the clips, so that the heads 35 of the T-studs move along the ramps 14 until the heads 35 of the T-studs rest on the shoulders 11 and are trapped there by the latching fingers 15. Axial compression of the sealing element 32 is brought about at the same time during this process. FIGS. 6 and 7 show the clips 1 in their installation or fastening positions.

The installation process just described is easy and fast to perform and guarantees reliable installation at all fastening regions. Considerable time saving is achieved by the pre-installation of the clips on the second component and the collective movement of the clips from their pre-installation positions to their installation or fastening positions, so separate feeding and adjustment of clips is not necessary. Pre installation of the clips on the second component allows the manufacturer of the second component to supply the second component to an end user in ready-to-install form for assembly. The second component can be easily removed from the first component, when desired, by pressing the latching fingers upward to allow the heads 35 of the T-studs 33 to move down the ramps 14 and out of the lead-in openings 17. By virtue of its design, the clip can be manufactured from plastic easily and economically, using a simple, two-part mold, for example.

While a preferred embodiment of the invention has been shown and described, changes can be made without departing from the principles and the spirit of the invention, the scope of which is defined in the accompanying claims.

What is claimed is:

1. A fastening system in which a retaining element on a first component and a clip on a second component are used to fasten the second component to the first component, and wherein:

the clip and the second component have cooperable mounting elements constructed to mount the clip on the second component, the clip and the first component have cooperable retaining elements constructed to retain the clip on the first component, the cooperable mounting elements are constructed to mount the clip on the second component at a pre-installation position before the cooperable retaining elements are effective to retain the clip on the first component; and the cooperable mounting elements are constructed so that the clip can move from the pre-installation position to an installation position at which the cooperable retaining elements are effective to retain the clip on the first component; and wherein the clip is constructed as a frame having an opening at the bottom for receiving the shank of a T-stud and a lead-in opening at one end for receiving a head of the T-stud, a shoulder that is substantially U-shaped and is substantially parallel to the bottom of the frame, and with legs of the U-shaped shoulder that merge with ramps disposed to engage the head of the T-stud entering the frame through the lead-in opening.

2. A fastening system according to claim 1, wherein the clip and the second component have cooperable guide surfaces disposed to guide the movement of the clip relative to the second component.

3. A fastening system according to claim 2, wherein the guide surfaces are provided on the cooperable mounting elements.

4. A fastening system in which a retaining element on a first component and a clip on a second component are used to fasten the second component to the first component, and wherein:
   the clip and the second component have cooperable mounting elements constructed to mount the clip on the second component,
   the clip and the first component have cooperable retaining elements constructed to retain the clip on the first component,
   the cooperable mounting elements are constructed to mount the clip on the second component at a pre-installation position before the cooperable retaining elements are effective to retain the clip on the first component, and
   the cooperable mounting elements are constructed so that the clip can move from the pre-installation position to an installation position at which the cooperable retaining elements are effective to retain the clip on the first component, and
   wherein the cooperable mounting elements include hooks on the clip that engage a rail on the second component
   wherein the cooperable retaining elements include a T-stud projecting from the first component through an opening in the clip, and a shoulder on the clip that engages a head of the T-stud, and
   wherein the second component has a wall from which a flange extends between the clip and the first component, the flange has an opening through which the T-stud projects, and the flange has a lip that engages a side of the clip opposite to a side of the clip where the hooks are located.

5. A fastening system according to claim 4, wherein the rail has a T-shaped cross-section with a stem projecting from the second component and a head embraced by the hooks from opposite sides of the stem.

6. A fastening system according to claim 1, wherein the frame has a resilient latch disposed and constructed to be lifted from an initial position by the head of the T-stud moving along the ramps and then to return to the initial position, at which it blocks movement of the T-stud toward the lead-in opening.

7. A fastening system according to claim 1, wherein a compressible seal is disposed between the first component and the second component and is compressed in response to movement of the clip to the installation position.

8. A fastening system according to claim 1, further comprising a detent that holds the clip temporarily at the pre-installation portion.

9. A fastening system according to claim 1, wherein the clip has a tool-receiving recess into which a tool is inserted to move the clip from the pre-installation position to the installation position.

10. A clip for use in fastening a second component to a first component, wherein the clip is constructed as a generally rectangular frame having a bottom, a pair of sides, and a pair of ends,
   wherein one of the sides has upwardly and downwardly facing hooks projecting outwardly therefrom for receiving a rail on a second component therebetween,
   wherein the bottom of the frame has an opening and one end of the frame has a lead-in opening so that a T-stud can be inserted in the frame from a first component,
   wherein the frame has a substantially U-shaped shoulder substantially parallel to the bottom of the frame with legs merging with respective ramps leading upwardly to the legs from locations adjacent to the lead-in opening, such that a head of a T-stud inserted through the lead-in opening can move along the ramps onto the shoulder.

11. A clip according to claim 10, wherein the frame has a resilient latch adjacent to the ramps constructed to be lifted from an initial position upon insertion of the head of a T-stud in the lead-in opening and then to return to the initial position to block movement of the head of the T-stud toward the lead-in opening.

12. A clip according to claim 10, wherein the frame has a guide step extending along the other side of the frame.

13. A clip according to claim 11, wherein the frame has a region at which the shoulder, ramps, and latch are located and a second region for receiving a tool to move the clip.

* * * * *